United States Patent
Huang (10) Patent No.: US 9,869,872 B2
(45) Date of Patent: Jan. 16, 2018

(54) THREE-DIMENSIONAL DISPLAY DEVICE

(71) Applicant: Delta Electronics, Inc., Taoyuan (TW)

(72) Inventor: June-Jei Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 15/180,387

(22) Filed: Jun. 13, 2016

(65) Prior Publication Data
US 2017/0139220 A1    May 18, 2017

(30) Foreign Application Priority Data
Nov. 13, 2015 (TW) .............................. 104137466 A (51) Int. Cl.
G02B 27/22 (2006.01)
G02B 3/08 (2006.01)
G03B 21/606 (2014.01)
G03B 35/24 (2006.01)

(52) U.S. Cl.
CPC ............ *G02B 27/2214* (2013.01); *G02B 3/08* (2013.01); *G02B 27/225* (2013.01); *G03B 21/606* (2013.01); *G03B 35/24* (2013.01)

(58) Field of Classification Search
CPC .. G02B 27/2214; G02B 27/26; G02B 27/225; G03B 35/20; G03B 35/26; H04N 13/0404; H04N 13/0409
See application file for complete search history.

(56) References Cited

U.S. PATENT DOCUMENTS

| | | | | |
|---|---|---|---|---|
| 6,593,957 B1* | 7/2003 | Christie | ............... | G02B 27/225 348/42 |
| 7,864,419 B2* | 1/2011 | Cossairt | ............. | G02B 27/0087 359/446 |
| 8,011,786 B2* | 9/2011 | Hentschke | ......... | G02B 27/2214 348/59 |
| 8,144,390 B2* | 3/2012 | Nam | .................. | G02B 27/2214 359/298 |
| 8,149,348 B2* | 4/2012 | Yun | ..................... | G02B 27/2214 349/57 |
| 8,558,961 B2* | 10/2013 | Yun | .................... | G02B 27/2214 349/57 |
| 8,736,957 B2* | 5/2014 | Endo | ...................... | G02B 27/26 348/57 |

(Continued)

FOREIGN PATENT DOCUMENTS

CN    103852819 A    6/2014
TW    201534980 A    9/2015

*Primary Examiner* — Bao-Luan Le
(74) *Attorney, Agent, or Firm* — Muncy, Geissler, Olds, & Lowe, P.C.

(57) ABSTRACT

A display device is provided. The display device includes a projection lens, a Fresnel lens, an angle magnifying screen, a vertical diffuser and a first micro-deflector. The projection lens is configured to provide an original image. The first micro-deflector is provided between the Fresnel lens and the angle magnifying screen, and the angle magnifying screen is provided between the first micro-deflector and the vertical diffuser. The first micro-deflector is configured to redirect the original image into a first perspective image and a second perspective image. A perspective direction of the first perspective image differs from a perspective direction of the second perspective image.

10 Claims, 9 Drawing Sheets

(56) References Cited

U.S. PATENT DOCUMENTS

| | | | | |
|---|---|---|---|---|
| 8,939,585 B2* | 1/2015 | Chen | H04N 13/0402 | 348/54 |
| 9,001,423 B2* | 4/2015 | Woodgate | H04N 13/0402 | 359/462 |
| 9,225,971 B2* | 12/2015 | Woodgate | H04N 13/0402 | |
| 9,420,266 B2* | 8/2016 | Woodgate | H04N 13/0402 | |
| 9,632,406 B2* | 4/2017 | Wang | G02B 3/005 | |
| 2005/0168816 A1* | 8/2005 | Fukaishi | G02B 27/26 | 359/465 |
| 2005/0270645 A1* | 12/2005 | Cossairt | G02B 27/0087 | 359/463 |
| 2008/0239484 A1* | 10/2008 | Fukaishi | G02B 27/2214 | 359/465 |
| 2009/0033873 A1* | 2/2009 | Hentschke | G02B 27/2214 | 353/7 |
| 2009/0147365 A1* | 6/2009 | Inokuma | C03C 17/007 | 359/599 |
| 2009/0262420 A1* | 10/2009 | Yun | H04N 13/0404 | 359/463 |
| 2010/0091354 A1* | 4/2010 | Nam | G02B 27/2214 | 359/298 |
| 2011/0063575 A1* | 3/2011 | Nelson | H04N 13/0404 | 353/7 |
| 2011/0164318 A1* | 7/2011 | Yun | G02B 27/2214 | 359/463 |
| 2012/0069435 A1 | 3/2012 | Oikawa et al. | | |
| 2012/0127570 A1* | 5/2012 | Sakai | G02B 27/2214 | 359/463 |
| 2012/0212814 A1* | 8/2012 | Endo | G02B 27/26 | 359/465 |
| 2014/0092472 A1* | 4/2014 | Woodgate | H04N 13/0402 | 359/464 |
| 2014/0133020 A1* | 5/2014 | Woodgate | H04N 13/0402 | 359/462 |
| 2014/0185015 A1* | 7/2014 | Chen | H04N 13/0402 | 353/7 |
| 2014/0192285 A1* | 7/2014 | Shinkai | H04N 13/0402 | 349/15 |
| 2014/0232836 A1* | 8/2014 | Woodgate | H04N 13/0402 | 348/54 |
| 2014/0300709 A1* | 10/2014 | Futterer | G03H 1/2286 | 348/51 |
| 2016/0246165 A1* | 8/2016 | Wang | H04N 13/0459 | |

* cited by examiner

THREE-DIMENSIONAL DISPLAY DEVICE

CROSS REFERENCE TO RELATED APPLICATIONS

This Application claims priority of Taiwan Patent Application No. 104137466, filed on Nov. 13, 2015, the entirety of which is incorporated by reference herein.

BACKGROUND OF THE INVENTION

Field of the Invention

The present invention relates to a display device, and in particular to a three-dimensional display device.

Description of the Related Art

In recent years, in order to approach realistic imaging, display technologies have advanced to meet the needs of viewers. Early planar display devices ameliorated color and resolution. Currently, three-dimensional display devices are providing the sensation of three-dimensional imagery.

In three-dimensional display technology, different perspective images are provided to the right and left eyes. Based on the visual characteristics of the human eye, when the eyes view the two images with the same content but different parallax, the observer experiences a sense of layering and depth, and the brain interprets these stereo images as being three-dimensional.

The application of three-dimensional display technology includes using purpose-built 3D glasses for viewing, or technologies relating to viewing by a person's naked-eye. In recent years, major developments have been made in naked-eye technologies. For example, in accordance with different methods of providing images to a viewing person, the naked-eye technology can be classified into the time multiplex method and the spatial multiplex method.

Figure 1:
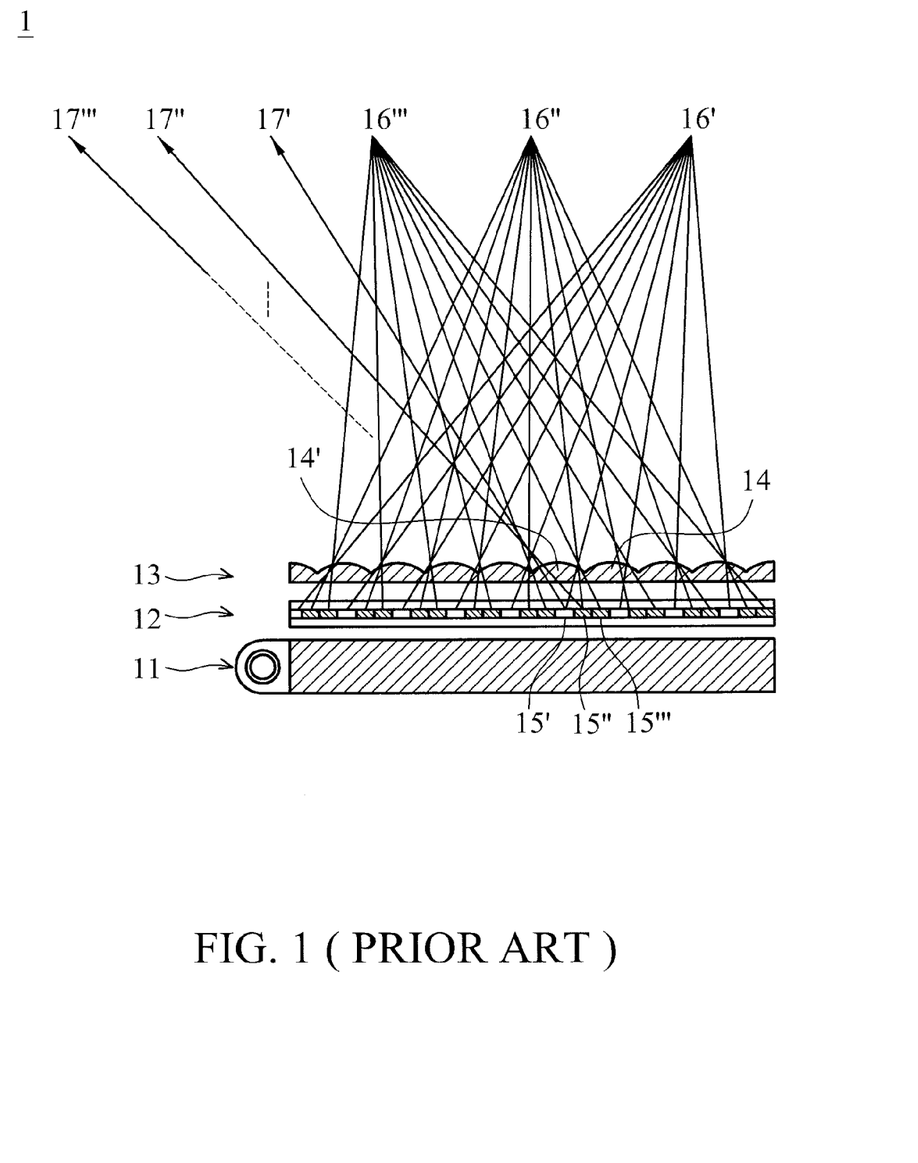
FIG. 1 shows a conventional three-dimensional display device utilizing a spatial multiplex design.

FIG. 1 is a schematic view of a conventional projection-type three-dimensional image display apparatus 1 using the spatial multiplex method. The three-dimensional display apparatus 1 comprises a backlight 11, a display device 12 and a lens array 13. The lenses 14 of the lens array 13 direct the pixels 15', 15" and 15'" to different spatial positions 16', 16" and 16'". Similarly, the lenses 14' of the lens array 13 direct the pixels 15', 15" and 15'" to different spatial positions 17', 17" and 17'".

Figure 2:
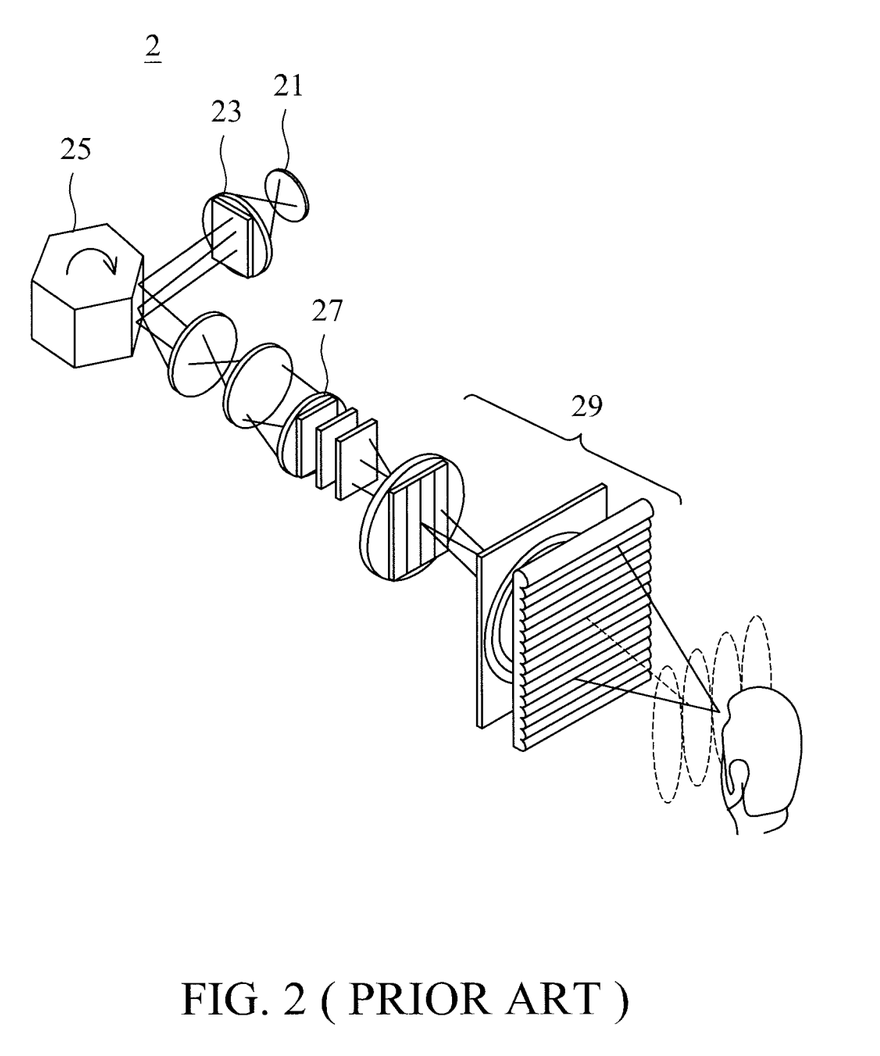
FIG. 2 shows a conventional three-dimensional display device utilizing a time multiplex design.

FIG. 2 is a schematic view of a conventional projection-type three-dimensional image display apparatus 2 using the time multiplex method. As shown in FIG. 2, the three-dimensional display apparatus 2 comprises a light source 21, a polarizer 23, a rotary polygonal mirror 25, a liquid crystal panel 27, and a number of optical components 29. The light beam generated by the light source 21 is polarized by the polarizer 23, and then the polarized light beam is reflected by the rotary polygonal mirror 25 towards the liquid crystal panel 27 to form images, creating a scanning-like effect. Subsequently, the images are projected onto different viewing zones by operations of the optical components 29. The aperture of the lens is divided into vertical lines. Corresponding to the scanning of the light source, the lines of the light source are scanning different lines, which are guided into different view zones. However, the reliability of this type of three-dimensional display apparatus 2 is poor due to the mechanical rotation of the rotary polygonal mirror 25. Also, the mechanical rotation creates high noise due to friction, and has a constrained rotational speed.

Both the spatial multiplex method and the time multiplex method have shortcomings and a three-dimensional display device having a lower cost, simplified structure, and high resolution is desirable.

BRIEF SUMMARY OF THE INVENTION

In one embodiment, a display device is provided. The display device includes a projection lens, a Fresnel lens, an angle magnifying screen, a vertical diffuser and a first micro-deflector. The projection lens is configured to provide an original image. The first micro-deflector is provided between the Fresnel lens and the angle magnifying screen, and the angle magnifying screen is provided between the first micro-deflector and the vertical diffuser. The first micro-deflector is configured to redirect the original image into a first perspective image and a second perspective image. A perspective direction of the first perspective image differs from a perspective direction of the second perspective image.

In one embodiment, the first micro-deflector comprises a first deflective area configured to redirect the original image into the first perspective image; and a second deflective area configured to redirect the original image into the second perspective image.

In one embodiment, the first deflective area and the second deflective area extend along a first direction.

In one embodiment, the first direction extends along a direction 45 degrees from a horizontal direction.

In one embodiment, the display device further comprises a second micro-deflector provided between the first micro-deflector and the angle magnifying screen. The second micro-deflector is configured to redirect the first perspective image into a first sub-perspective image and a second sub-perspective image; and redirect the second perspective image into a third sub-perspective image and a fourth sub-perspective image, and wherein perspective directions of the first, second, third and fourth sub-perspective images differ from each other.

In one embodiment, the second micro-deflector comprises a first sub-deflective area and a second sub-deflective area configured to redirect the first perspective image into the first sub-perspective image and the second sub-perspective image; and redirect the second perspective image into the third sub-perspective image and the fourth sub-perspective image.

In one embodiment, the first deflective area and the second deflective area extend along a first direction, and the first sub-deflective area and the second sub-deflective area extend along a second direction, and wherein an included angle between the first direction and the second direction is 45 degrees.

The following equation may be used to determine deflective power:

$$\sin\varphi_o = n^*\sin\theta_2\sqrt{1-[\sin(\theta_2-\varphi_i)/n]^2} - \cos\theta_2^*\sin(\theta_2-\varphi_i)$$

$$\sin\varphi_o = n^*\sin\theta_1\sqrt{1-[\sin(\theta_1+\varphi_i)/n]^2} - \cos\theta_1^*\sin(\theta_1+\varphi_i)$$

In one embodiment, the deflective powers of the first deflective area and the second deflective area are (−2, +2). In one embodiment, the deflective powers of the first sub-deflective area and the second sub-deflective area are (−1, +1).

In one embodiment, the first deflector further comprises a third deflective area, and the second deflector further comprises a third sub-deflective area, and wherein the first, second and third deflective areas extend along a first direction, and the first, second and third sub-deflective areas extend along a second direction, and wherein an included angle between the first direction and the second direction is 45 degrees.

In one embodiment, the deflective powers of the first deflective area, the second deflective area and the third deflective area are (−3, 0, +3). Deflective powers of the first sub-deflective area, the second sub-deflective area and the third sub-deflective area are (−1, 0, +1).

In one embodiment, the second deflector further comprises a third sub-deflective area and a fourth sub-deflective area, and the first deflective area and the second deflective area extend along a first direction, and the first, second, third and fourth sub-deflective areas extend along a second direction, and an included angle between the first direction and the second direction is 45 degrees.

In one embodiment, deflective powers of the first deflective area and the second deflective area are (−4, +4). In one embodiment, the deflective powers of the first sub-deflective area, the second sub-deflective area, the third sub-deflective area and the fourth sub-deflective area are (−3, −1, +1, +3).

In one embodiment, a display device is provided. The display device includes a projection lens, a first micro-deflector and a second micro-deflector. The projection lens is configured to provide an original image. The original image is redirected by the first micro-deflector into a first perspective image and the second perspective image. The perspective direction of the first perspective image differs from the perspective direction of the second perspective image. The first perspective image is redirected by the second micro-deflector into a first sub-perspective image and the second sub-perspective image. The second perspective image is redirected by the second micro-deflector into a third sub-perspective image and the fourth sub-perspective image. Perspective directions of the first, second, third and fourth sub-perspective image differ from each other.

Utilizing the micro-deflector and the arrangement thereof of the embodiment of the invention, the number of perspective images of the display device may be multiplied to provide three-dimensional images with a high resolution. In particular, the micro-deflector and the arrangement thereof can be utilized in a display device with a time multiplex design, and incorporate the advantages of the spatial multiplex and the time multiplex.

BRIEF DESCRIPTION OF THE DRAWINGS

The present invention can be more fully understood by reading the subsequent description and examples with references made to the accompanying drawings, wherein.

DESCRIPTION OF THE PREFERRED EMBODIMENT

Figure 3:
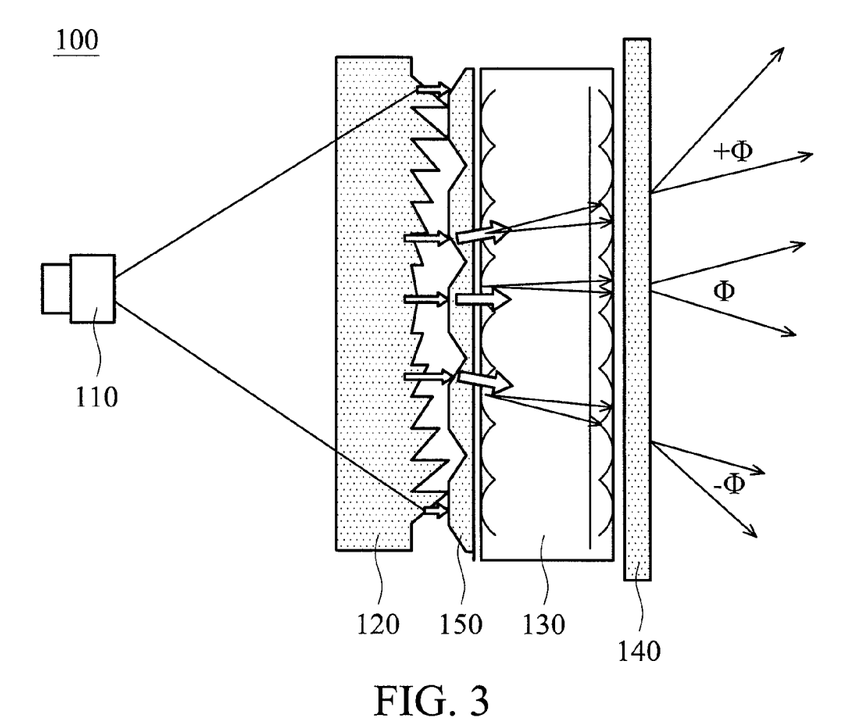
FIG. 3 shows a display device of a first embodiment of the invention.

FIG. 3 shows a display device 100 according to a first embodiment of the invention. The display device 100 includes a projection lens 110, a Fresnel lens 120, an angle magnifying screen 130, a vertical diffuser 140 and a first micro-deflector 150. The projection lens 110 provides an original image. The first micro-deflector 150 is sandwiched between the Fresnel lens 120 and the angle magnifying screen 130. The angle magnifying screen 130 is sandwiched between the first micro-deflector 150 and the vertical diffuser 140. The original image is redirected by the first micro-deflector 150 into a first perspective image and a second perspective image. The perspective direction of the first perspective image differs from the perspective direction of the second perspective image.

Figure 4A:
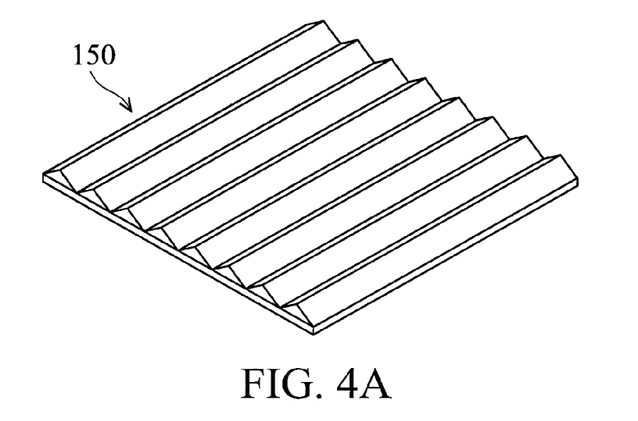
FIG. 4A shows a first micro-deflector of the first embodiment of the invention.
Figure 4B:
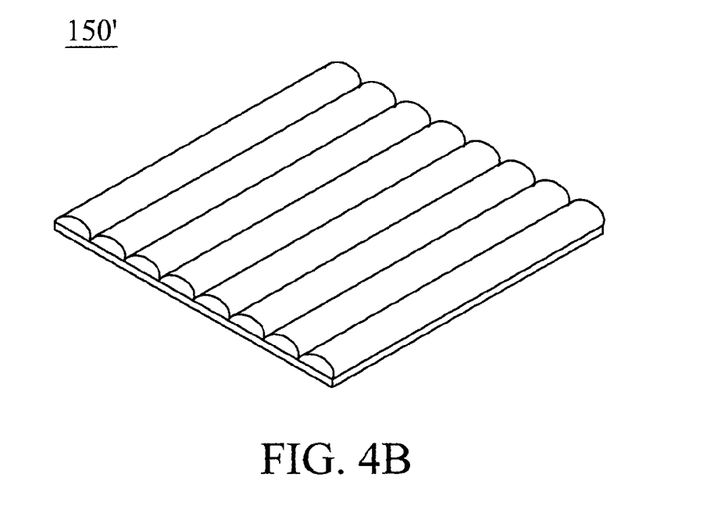
FIG. 4B shows an alternative micro-deflector embodiment.
Figure 4C:
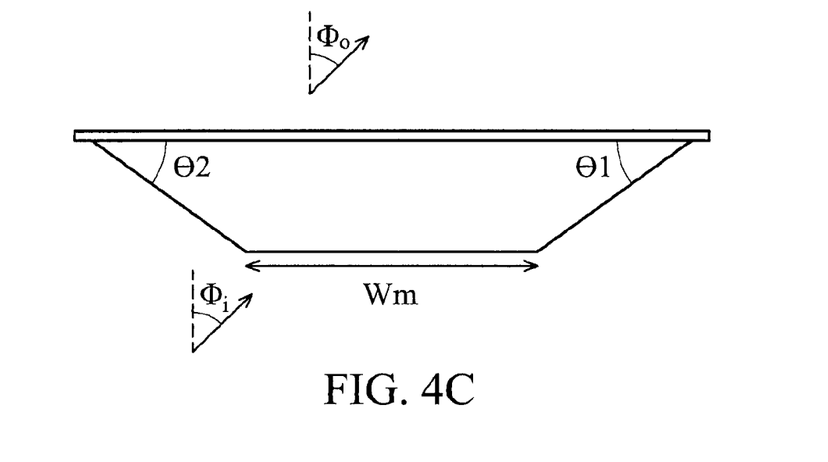
FIG. 4C shows a design principle of the first micro-deflector of the embodiments of the invention.

FIG. 4A shows an embodiment of the first micro-deflector 150. In this embodiment, the deflective power of the first micro-deflector 150 is designed to be (−1, +1). FIG. 4B shows another embodiment of the first micro-deflector 150'. In this embodiment, the deflective power of the first micro-deflector 150' is designed to be (−1, 0, +1). With reference to FIG. 4C, the deflective power can be designed according to the following equations:

$$\sin \varphi_o = n^* \sin \theta_2 \sqrt{1-[\sin(\theta_2-\varphi_i)/n]^2} - \cos \theta_2 * \sin(\theta_2-\varphi_i)$$

$$\sin \varphi_o = n^* \sin \theta_1 \sqrt{1-[\sin(\theta_1+\varphi_i)/n]^2} - \cos \theta_1 * \sin(\theta_1+\varphi_i)$$

$\theta_1$ represents the acute angle of the right side, $\theta_2$ represents the acute angle of the left side, $W_m$, represents the width of the bottom side, n represents the index of refraction, $\Phi_i$ represents the incident angle, and $\Phi_o$ represents the emission angle.

Figure 5A:
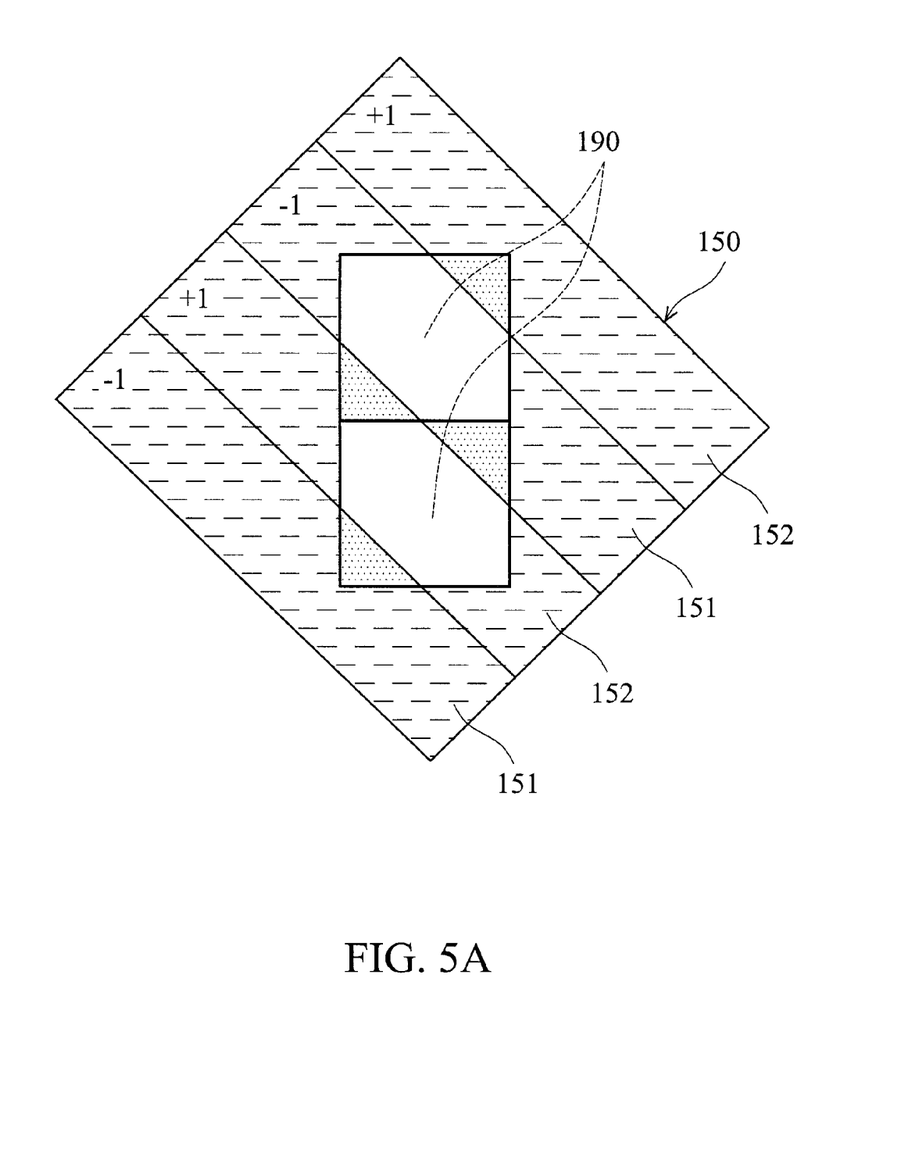
FIG. 5A shows a detailed structure of the first micro-deflector of an embodiment of the invention.
Figure 5B:
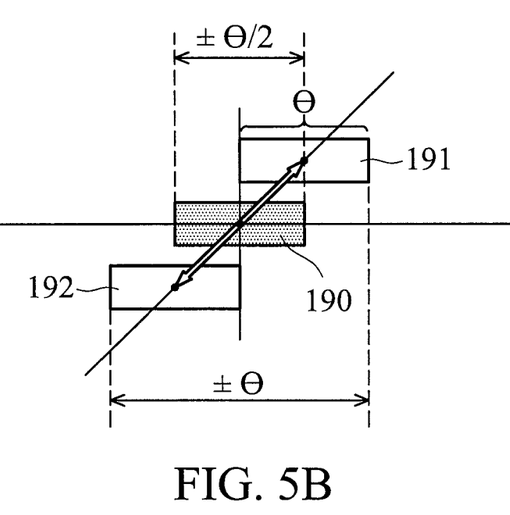
FIG. 5B shows a deflective effect of the first micro-deflector of an embodiment of the invention.
Figure 5C:
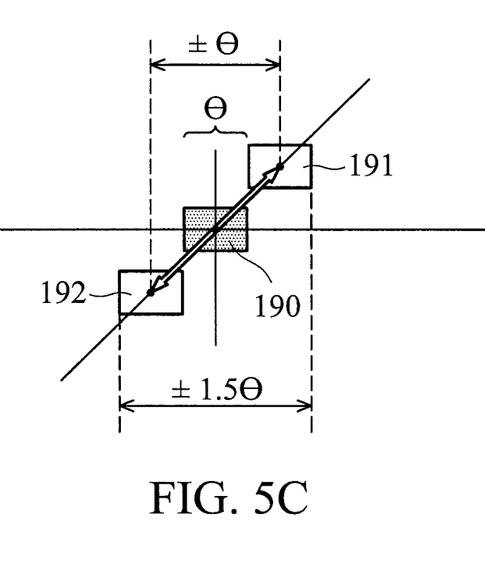
FIG. 5C shows a deflective effect of the first micro-deflector of another embodiment of the invention.

With reference to FIGS. 5A, 5B and 5C, in one embodiment, the first micro-deflector 150 comprises a first deflective area 151 and a second deflective area 152. The original image 190 (including a plurality of pixel images) passes the first deflective area 151 and the second deflective area 152 to be redirected into the first perspective image and the second perspective image. In this embodiment, the first deflective area 151 and the second deflective area 152 are arranged along a first direction, and an included angle between the first direction and a horizontal direction is 45 degrees. In an alternate example, the first deflective area 151 and the second deflective area 152 are arranged along a first direction, and the first direction is a horizontal direction. FIGS. 5A and 5C show the effect of the first micro-deflector 150 of the embodiment of FIG. 5A, wherein the original image 190 is redirected into the first perspective image 191 and the second perspective image 192 by the first micro-deflector 150. In this embodiment, a quarter of the original image 190 (in this embodiment, the upper right corner portion and the lower left corner portion) can be blocked by a mask. In this embodiment, the redirection effect in the vertical direction can be removed by the vertical diffuser 140.

Utilizing the micro-deflector and the arrangement thereof of the embodiment of the invention, the number of perspective images of the display device is multiplied to provide three-dimensional images with a high resolution. The micro-deflector and the arrangement thereof can also be utilized by a display device with a time multiplex design to incorporate the advantages of the spatial multiplex and the time multiplex.

Figure 6:
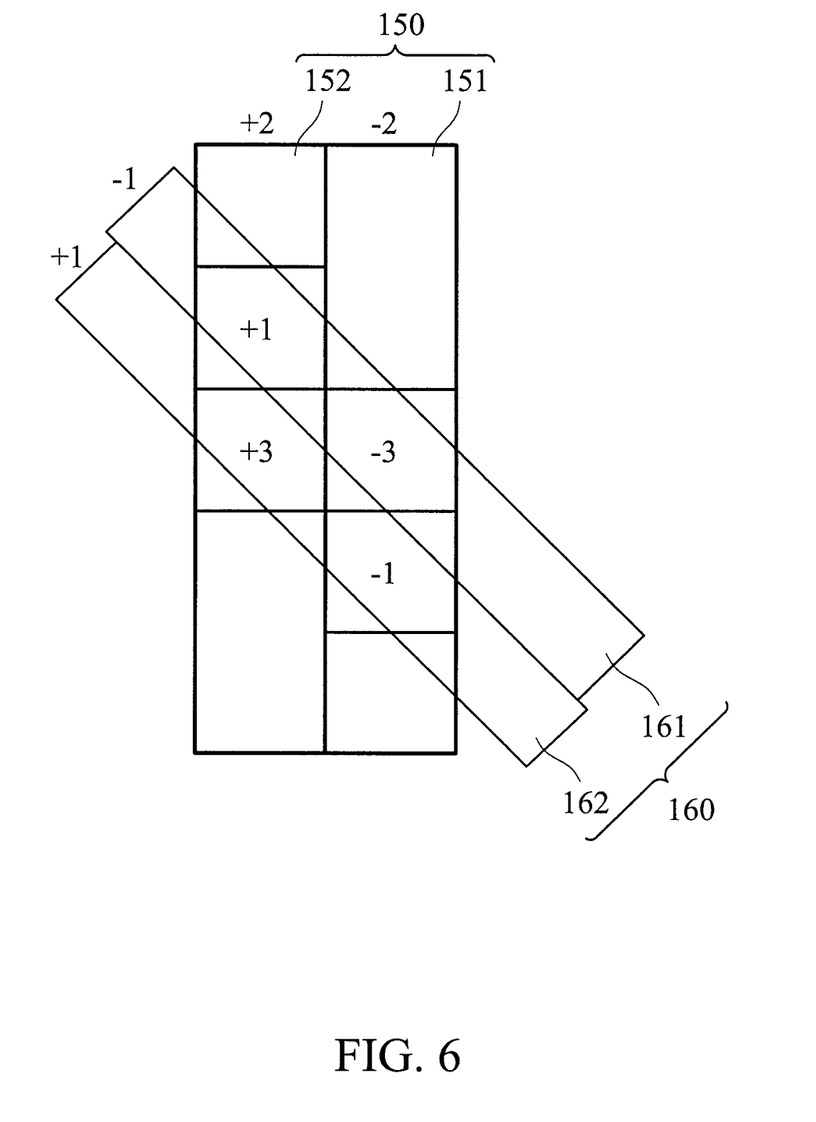
FIG. 6 shows a display device of a second embodiment of the invention.

FIG. 6 shows a display device according to a second embodiment of the invention, which further comprises a second micro-deflector 160 overlapping the first micro-deflector 150. The second micro-deflector 160 comprises a first sub-deflective area 161 and a second sub-deflective area 162. A first perspective image passes the first sub-deflective area 161 and the second sub-deflective area 162 to be redirected into a first sub-perspective image and a second sub-perspective image. A second perspective image passes the first sub-deflective area 161 and the second sub-deflective area 162 to be redirected into a third sub-perspective image and a fourth sub-perspective image. The first sub-deflective area 161 and the second sub-deflective area 162 are arranged along a second direction. An included angle between the first direction and the second direction is 45 degrees. In one embodiment, the deflective powers of the first deflective area 151 and the second deflective area 152 are (−2, +2), and the deflective powers of the first sub-deflective area 161 and the second sub-deflective area 162 are (−1, +1). Accordingly, the deflective power of (−3, −1, +1, +3) is provided, wherein the difference of the deflective power relating to each pixel is 2. Therefore, the embodiment provides a uniform deflective performance. Utilizing this embodiment, the number of perspective images is quadrupled.

Figure 7:
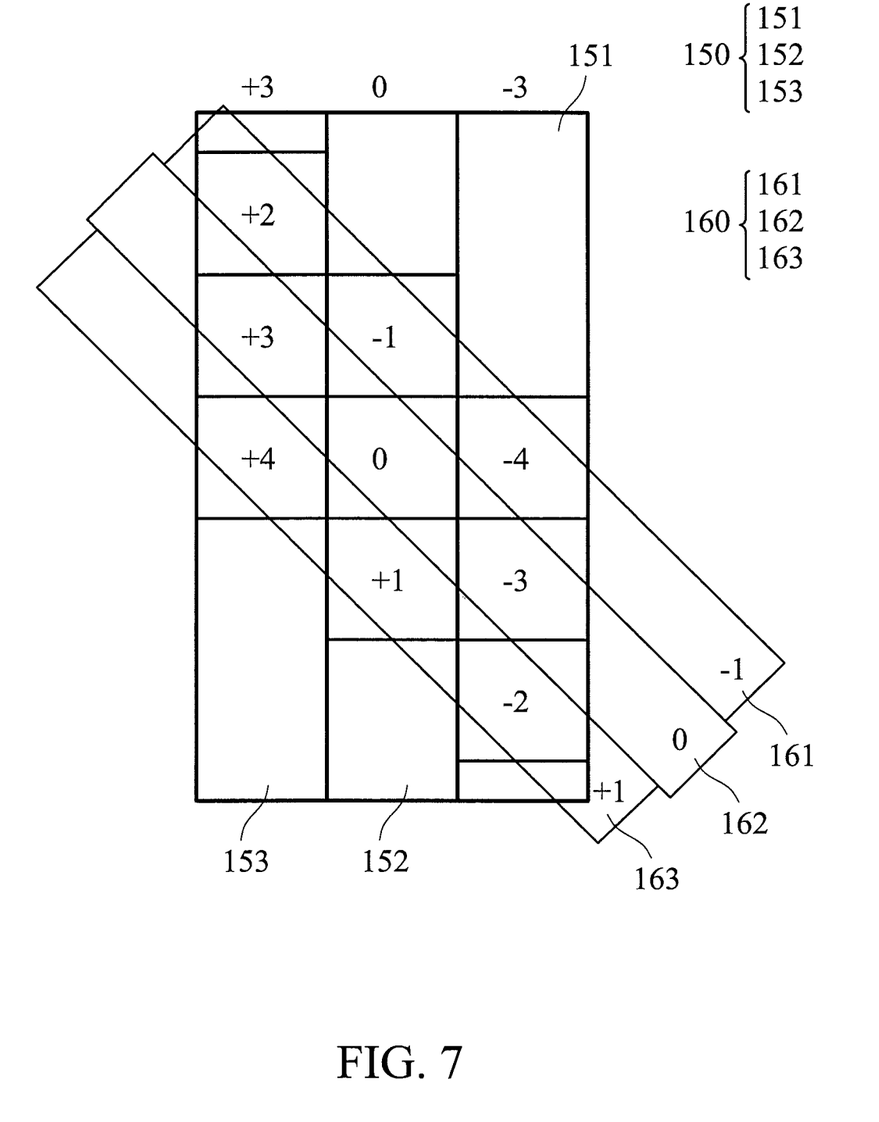
FIG. 7 shows a display device of a third embodiment of the invention.

FIG. 7 shows a display device according to a third embodiment of the invention, wherein the first deflector 150 further comprises a third deflective area 153 and the second deflector 160 further comprises a third sub-deflective area 163. The first deflective area 151, the second deflective area 152 and the third deflective area 153 are arranged along a first direction. The first sub-deflective area 161, the second sub-deflective area 162 and the third sub-deflective area 163 are arranged along a second direction. An included angle between the first direction and the second direction is 45 degrees. In this embodiment, the deflective powers of the first deflective area 151, the second deflective area 152 and the third deflective area 153 are (−3, 0, +3), and the deflective powers of the first sub-deflective area 161, the second sub-deflective area 162 and the third sub-deflective area 163 are (−1, 0, +1). Accordingly, the deflective power of (−4, −3, −2, −1, 0, +1, +2, +3, +4) is provided, wherein the difference of the deflective power relating to each pixel is 1. Therefore, the embodiment provides a uniform deflective performance. Utilizing this embodiment, the number of perspective images is increased nine-fold.

Figure 8:
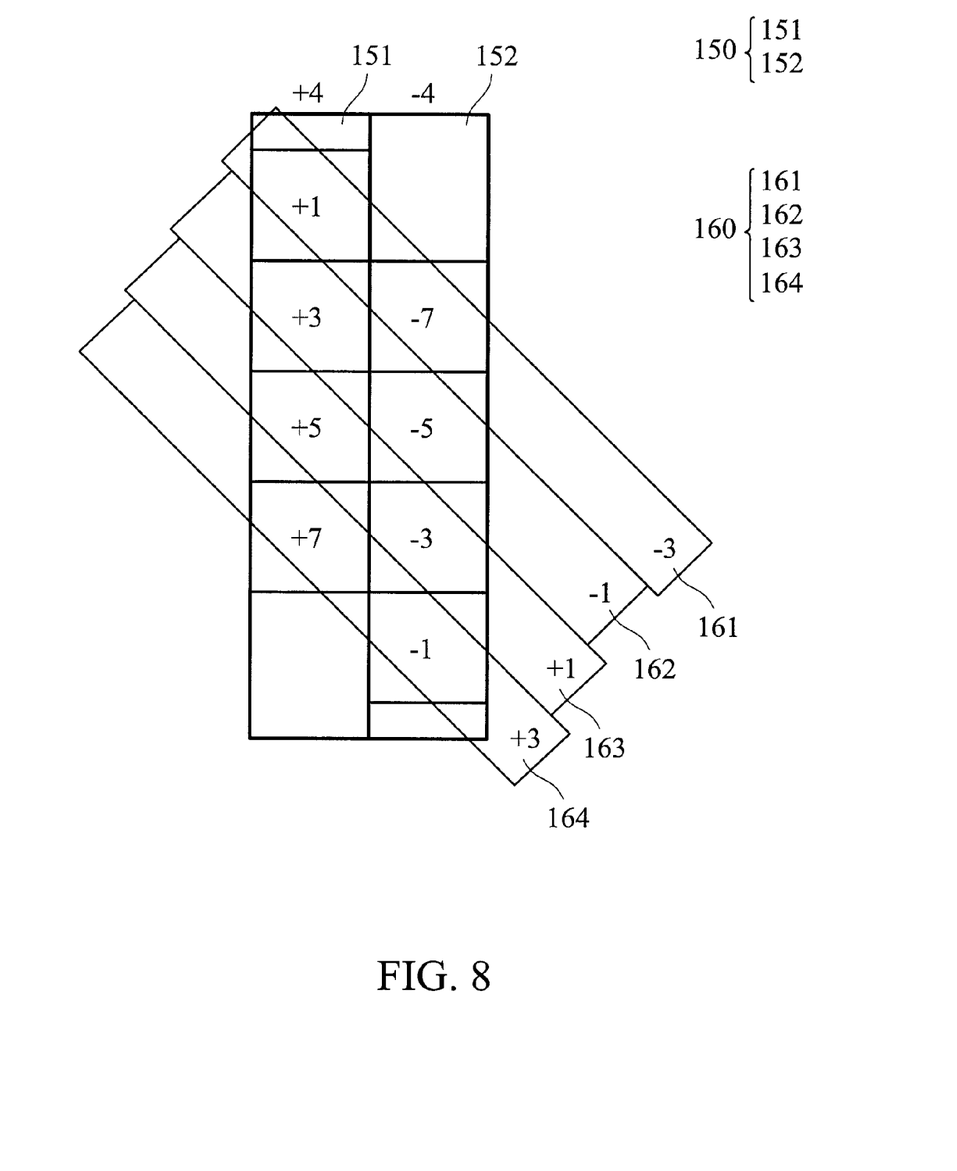
FIG. 8 shows a display device of a fourth embodiment of the invention.

FIG. 8 shows the display device according to a fourth embodiment of the invention, wherein the second deflector 160 further comprises a third sub-deflective area 163 and a fourth sub-deflective area 164. The first deflective area 151 and the second deflective area 152 are arranged along a first direction. The first sub-deflective area 161, the second sub-deflective area 162, the third sub-deflective area 163 and the fourth sub-deflective area 164 are arranged along a second direction. An included angle between the first direction and the second direction is 45 degrees. In one embodiment, the deflective powers of the first deflective area 151 and the second deflective area 152 are (−4, +4), and the deflective powers of the first sub-deflective area, the second sub-deflective area, the third sub-deflective area and the fourth sub-deflective area are (−3, −1, +1, +3). Accordingly, the deflective power of (−7, −5, −3, −1, +1, +3, +5, +7) is provided, wherein the difference of the deflective power relating to each pixel is 2. Therefore, the embodiment provides a uniform deflective performance. Utilizing this embodiment, the number of perspective images is increased eightfold.

Use of ordinal terms such as "first", "second", "third", etc., in this specification to modify an element/feature does not by itself connote any priority, precedence, or order of one element/feature over another or the temporal order in which acts of a method are performed, but are used merely as labels to distinguish one element/feature having a certain name from another element/feature having the same name (but for use of the ordinal term).

While the invention has been described by way of example and in terms of the preferred embodiments, it is to be understood that the invention is not limited to the disclosed embodiments. On the contrary, it is intended to cover alternative modifications and similar arrangements (as would be apparent to those skilled in the art). Therefore, the scope of the appended claims should be accorded the broadest interpretation to encompass all such modifications and similar arrangements.

What is claimed is:

1. A display device, comprising:
a projection lens configured to provide an original image;
a Fresnel lens;
an angle magnifying screen;
a vertical diffuser;
a first micro-deflector; and
a second micro-deflector provided between the first micro-deflector and the angle magnifying screen,
wherein the first micro-deflector is provided between the Fresnel lens and the angle magnifying screen, and the angle magnifying screen is provided between the first micro-deflector and the vertical diffuser,
wherein the first micro-deflector is configured to redirect the original image into a first perspective image and a second perspective image, and wherein a perspective direction of the first perspective image differs from a perspective direction of the second perspective image,
wherein the first micro-deflector comprises a first deflective area configured to redirect the original image into the first perspective image; and a second deflective area configured to redirect the original image into the second perspective image,
wherein the second micro-deflector is configured to redirect the first perspective image into a first sub-perspective image and a second sub-perspective image; and redirect the second perspective image into a third sub-perspective image and a fourth sub-perspective image, and wherein perspective directions of the first, second, third and fourth sub-perspective images differ from each other,
wherein the second micro-deflector comprises a first sub-deflective area and a second sub-deflective area configured to redirect the first perspective image into the first sub-perspective image and the second sub-perspective image; and redirect the second perspective image into the third sub-perspective image and the fourth sub-perspective image, and wherein using the following equation to determine a deflective power:

$$\sin \varphi_o = n^* \sin \theta_2 \sqrt{1-[\sin(\theta_2-\varphi_i)/n]^2} - \cos \theta_2 * \sin(\theta_2-\varphi_i)$$

$$\sin \varphi_o = n^* \sin \theta_1 \sqrt{1-[\sin(\theta_1+\varphi_i)/n]^2} - \cos \theta_1 * \sin(\theta_1+\varphi_i)$$

the deflective powers of the first deflective area and the second deflective area are (−2, +2), and the deflective powers of the first sub-deflective area and the second sub-deflective area are (−1, +1).

2. The display device as claimed in claim 1, wherein the first deflective area and the second deflective area extend along a first direction.

3. The display device as claimed in claim 2, wherein the first direction extends along a direction 45 degrees from a horizontal direction.

4. The display device as claimed in claim 1, wherein the first deflective area and the second deflective area extend along a first direction, and the first sub-deflective area and the second sub-deflective area extend along a second direction, and wherein an included angle between the first direction and the second direction is 45 degrees.

5. A display device, comprising:
a projection lens configured to provide an original image;
a Fresnel lens;
an angle magnifying screen;
a vertical diffuser;
a first micro-deflector; and
a second micro-deflector provided between the first micro-deflector and the angle magnifying screen,
wherein the first micro-deflector is provided between the Fresnel lens and the angle magnifying screen, and the angle magnifying screen is provided between the first micro-deflector and the vertical diffuser,
wherein the first micro-deflector is configured to redirect the original image into a first perspective image and a second perspective image, and wherein a perspective direction of the first perspective image differs from a perspective direction of the second perspective image,
wherein the first micro-deflector comprises a first deflective area configured to redirect the original image into the first perspective image; and a second deflective area configured to redirect the original image into the second perspective image,
wherein the second micro-deflector is configured to redirect the first perspective image into a first sub-perspective image and a second sub-perspective image; and redirect the second perspective image into a third sub-perspective image and a fourth sub-perspective image, and wherein perspective directions of the first, second, third and fourth sub-perspective images differ from each other,
wherein the second micro-deflector comprises a first sub-deflective area and a second sub-deflective area configured to redirect the first perspective image into the first sub-perspective image and the second sub-perspective image; and redirect the second perspective image into the third sub-perspective image and the fourth sub-perspective image,
wherein the first deflector further comprises a third deflective area, and the second deflector further comprises a third sub-deflective area, and wherein the first, second and third deflective areas extend along a first direction, and the first, second and third sub-deflective areas extend along a second direction, and wherein an included angle between the first direction and the second direction is 45 degrees, and wherein using the following equation to determine a deflective power:

$$\sin \varphi_o = n^* \sin \theta_2 \sqrt{1-[\sin(\theta_2-\varphi_i)/n]^2} - \cos \theta_2 * \sin(\theta_2-\varphi_i)$$

$$\sin \varphi_o = n^* \sin \theta_1 \sqrt{1-[\sin(\theta_1+\varphi_i)/n]^2} - \cos \theta_1 * \sin(\theta_1+\varphi_i)$$

the deflective powers of the first deflective area, the second deflective area and the third deflective area are (−3, 0, +3), and the deflective powers of the first sub-deflective area, the second sub-deflective area and the third sub-deflective area are (−1, 0, +1).

6. A display device, comprising:
a projection lens configured to provide an original image;
a Fresnel lens;
an angle magnifying screen;
a vertical diffuser;
a first micro-deflector; and
a second micro-deflector provided between the first micro-deflector and the angle magnifying screen,
wherein the first micro-deflector is provided between the Fresnel lens and the angle magnifying screen, and the angle magnifying screen is provided between the first micro-deflector and the vertical diffuser,
wherein the first micro-deflector is configured to redirect the original image into a first perspective image and a second perspective image, and wherein a perspective direction of the first perspective image differs from a perspective direction of the second perspective image,
wherein the first micro-deflector comprises a first deflective area configured to redirect the original image into the first perspective image; and a second deflective area configured to redirect the original image into the second perspective image,
wherein the second micro-deflector is configured to redirect the first perspective image into a first sub-perspective image and a second sub-perspective image; and redirect the second perspective image into a third sub-perspective image and a fourth sub-perspective image, and wherein perspective directions of the first, second, third and fourth sub-perspective images differ from each other,
wherein the second micro-deflector comprises a first sub-deflective area and a second sub-deflective area configured to redirect the first perspective image into the first sub-perspective image and the second sub-perspective image; and redirect the second perspective image into the third sub-perspective image and the fourth sub-perspective image,
wherein the second deflector further comprises a third sub-deflective area and a fourth sub-deflective area, and the first deflective area and the second deflective area extend along a first direction, and the first, second, third and fourth sub-deflective areas extend along a second direction, and an included angle between the first direction and the second direction is 45 degrees, and
wherein using the following equation to determine a deflective power:

$$\sin \varphi_o = n^* \sin \theta_2 \sqrt{1-[\sin(\theta_2-\varphi_i)/n]^2} - \cos \theta_2 * \sin(\theta_2-\varphi_i)$$

$$\sin \varphi_o = n^* \sin \theta_1 \sqrt{1-[\sin(\theta_1+\varphi_i)/n]^2} - \cos \theta_1 * \sin(\theta_1+\varphi_i)$$

the deflective powers of the first deflective area and the second deflective area are (−4, +4), and the deflective powers of the first sub-deflective area, the second sub-deflective area, the third sub-deflective area and the fourth sub-deflective area are (−3, −1, +1, +3).

7. A display device, comprising:
a projection lens configured to provide an original image;
a first micro-deflector configured to receive the original image and redirect into a first perspective image and a second perspective image, wherein the first perspective image and the second perspective image comprise different perspective directions; and
a second micro-deflector configured to receive the first perspective image and redirect into a first sub-perspective image and a second sub-perspective image, the second micro-deflector further configured to receive the second perspective image and redirect into a third sub-perspective image and a fourth sub-perspective image, wherein the first, second, third and fourth sub-perspective images comprise different perspective directions,
wherein the first micro-deflector comprises a first deflective area configured to receive the original image and redirect into the first perspective image; and a second deflective area configured to receive the original image and redirect into the second perspective image, and wherein the second micro-deflector comprises a first sub-deflective area configured to receive the first perspective image and redirect into the first sub-perspective image and the second sub-perspective image, and a second sub-deflective area configured to receive the second perspective image and redirect into the third sub-perspective image and the fourth sub-perspective image, and
wherein using the following equation to determine a deflective power:

$$\sin \varphi_o = n^* \sin \theta_2 \sqrt{1-[\sin(\theta_2-\varphi_i)/n]^2} - \cos \theta_2 * \sin(\theta_2 - \varphi_i)$$

$$\sin \varphi_o = n^* \sin \theta_1 \sqrt{1-[\sin(\theta_1+\varphi_i)/n]^2} - \cos \theta_1 * \sin(\theta_1 + \varphi_i)$$

the deflective powers of the first deflective area and the second deflective area are (−2, +2), and the deflective powers of the first sub-deflective area and the second sub-deflective area are (−1, +1).

8. The display device as claimed in claim 7, wherein the first deflective area and the second deflective area extend along a first direction, the first sub-deflective area and the second sub-deflective area extend along a second direction, and an included angle between the first direction and the second direction is 45 degrees.

9. A display device, comprising:
a projection lens configured to provide an original image;
a first micro-deflector configured to receive the original image and redirect into a first perspective image and a second perspective image, wherein the first perspective image and the second perspective image comprise different perspective directions; and
a second micro-deflector configured to receive the first perspective image and redirect into a first sub-perspective image and a second sub-perspective image, the second micro-deflector further configured to receive the second perspective image and redirect into a third sub-perspective image and a fourth sub-perspective image, wherein the first, second, third and fourth sub-perspective images comprise different perspective directions,
wherein the first micro-deflector comprises a first deflective area configured to receive the original image and redirect into the first perspective image; and a second deflective area configured to receive the original image and redirect into the second perspective image, and wherein the second micro-deflector comprises a first sub-deflective area configured to receive the first perspective image and redirect into the first sub-perspective image and the second sub-perspective image, and a second sub-deflective area configured to receive the second perspective image and redirect into the third sub-perspective image and the fourth sub-perspective image,
wherein the first deflector further comprises a third deflective area, and the second deflector further comprises a third sub-deflective area, and wherein the first, second and third deflective areas extend along a first direction, and the first, second and third sub-deflective areas extend along a second direction, and wherein an included angle between the first direction and the second direction is 45 degrees, and
wherein using the following equation to determine a deflective power:

$$\sin \varphi_o = n^* \sin \theta_2 \sqrt{1-[\sin(\theta_2-\varphi_i)/n]^2} - \cos \theta_2 * \sin(\theta_2 - \varphi_i)$$

$$\sin \varphi_o = n^* \sin \theta_1 \sqrt{1-[\sin(\theta_1+\varphi_i)/n]^2} - \cos \theta_1 * \sin(\theta_1 + \varphi_i)$$

the deflective powers of the first deflective area, the second deflective area and the third deflective area are (−3, 0, +3), and the deflective powers of the first sub-deflective area, the second sub-deflective area and the third sub-deflective area are (−1, 0, +1).

10. A display device, comprising:
a projection lens configured to provide an original image;
a first micro-deflector configured to receive the original image and redirect into a first perspective image and a second perspective image, wherein the first perspective image and the second perspective image comprise different perspective directions; and
a second micro-deflector configured to receive the first perspective image and redirect into a first sub-perspective image and a second sub-perspective image, the second micro-deflector further configured to receive the second perspective image and redirect into a third sub-perspective image and a fourth sub-perspective image, wherein the first, second, third and fourth sub-perspective images comprise different perspective directions,
wherein the first micro-deflector comprises a first deflective area configured to receive the original image and redirect into the first perspective image; and a second deflective area configured to receive the original image and redirect into the second perspective image, and wherein the second micro-deflector comprises a first sub-deflective area configured to receive the first perspective image and redirect into the first sub-perspective image and the second sub-perspective image, and a second sub-deflective area configured to receive the second perspective image and redirect into the third sub-perspective image and the fourth sub-perspective image, wherein the second deflector further comprises a third sub-deflective area and a fourth sub-deflective area, and the first deflective area and the second deflective area extend along a first direction, and the first, second, third and fourth sub-deflective areas extend along a second direction, and an included angle between the first direction and the second direction is 45 degrees, and wherein using the following equation to determine a deflective power:

$$\sin \varphi_o = n \ast \sin \theta_2 \sqrt{1-[\sin(\theta_2-\varphi_i)/n]^2} - \cos \theta_2 \ast \sin(\theta_2-\varphi_i)$$

$$\sin \varphi_o = n \ast \sin \theta_1 \sqrt{1-[\sin(\theta_1+\varphi_i)/n]^2} - \cos \theta_1 \ast \sin(\theta_1+\varphi_i)$$

the deflective powers of the first deflective area and the second deflective area are (−4, +4), and the deflective powers of the first sub-deflective area, the second sub-deflective area, the third sub-deflective area and the fourth sub-deflective area are (−3, −1, +1, +3).

* * * * *